United States Patent [19]

Lew

[11] Patent Number: 5,220,842
[45] Date of Patent: Jun. 22, 1993

[54] VORTEX GENERATOR-SENSOR WITH PIVOTALLY BALANCED MASS DISTRIBUTION

[76] Inventor: Hyok S. Lew, 7890 Oak St., Arvada, Colo. 80005

[21] Appl. No.: 749,980

[22] Filed: Aug. 26, 1991

Related U.S. Application Data

[63] Continuation-in-part of Ser. No. 636,680, Dec. 31, 1990, Pat. No. 5,127,273.

[51] Int. Cl.$^5$ .............................. G01F 1/32
[52] U.S. Cl. ................................. 73/861.24
[58] Field of Search ................. 73/861.22, 861.24

[56] References Cited

U.S. PATENT DOCUMENTS

| | | | |
|---|---|---|---|
| 1,935,445 | 11/1933 | Heinz | 73/861.24 |
| 4,083,240 | 4/1978 | Herzl | 73/861.24 |
| 4,181,020 | 1/1980 | Herzl | 73/861.24 |
| 4,526,040 | 7/1985 | Matsubara | 73/861.24 |
| 4,679,445 | 7/1987 | Knudsen et al. | 73/861.24 |

Primary Examiner—Herbert Goldstein

[57] ABSTRACT

A vortex flowmeter comprises a vortex generating bluff body of an elongated cylindrical shape disposed across a cross section of the flow passage, which bluff body has a planar extension extending from one extremity thereof and into a planar cavity included in the flowmeter body, wherein the combination of the bluff body and the planar extension thereof is supported at a midsection of the combination in an arrangement allowing at least a minute amount of pivotal movement about a pivot axis disposed parallel to the direction of the fluid flow and passing through the midsection of the combination of the bluff body and the planar extension thereof, and a plurality of pressure communicating holes disposed through the bluff body and the planar extension thereof expose one side face of the planar extension to the fluid pressure existing at the other side face of the bluff body opposite to said one side face, and the other side face of the planar extension to the fluid pressure existing at one side face of the bluff body, which arrangement produces an alternating torque about the pivot axis generated by the vortex shedding from the bluff body and experienced by the combination of the bluff body and the planar extension thereof, and generates an alternating electrical signal representing the vortex shedding from at least one transducer connected to one extremity of the combination of the bluff body and the planar extension thereof.

9 Claims, 2 Drawing Sheets

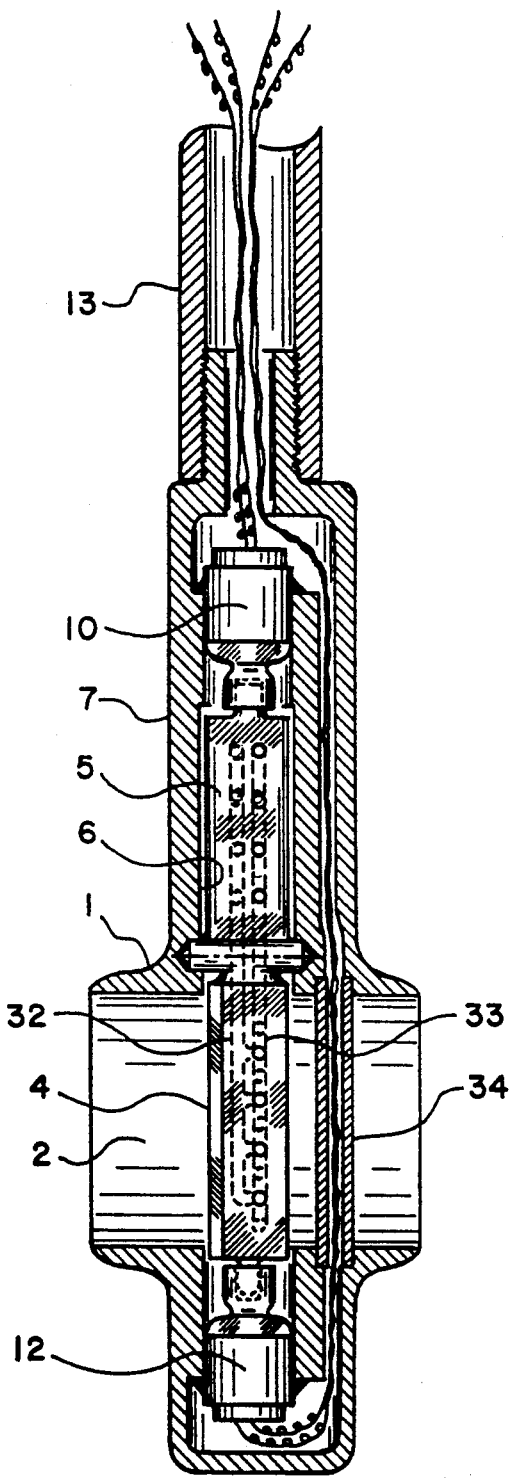
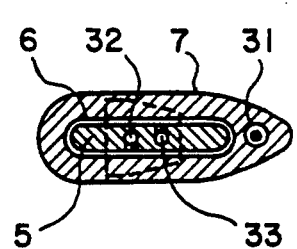
Fig. 3
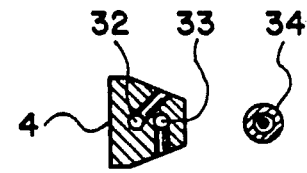
Fig. 4
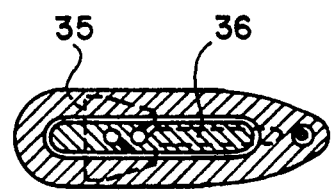
Fig. 6
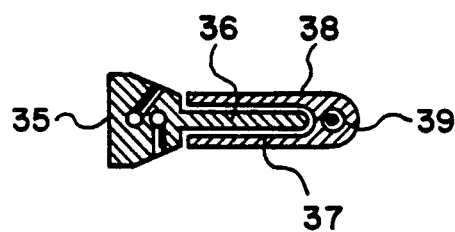
Fig. 7
Fig. 5

VORTEX GENERATOR-SENSOR WITH PIVOTALLY BALANCED MASS DISTRIBUTION

This patent application is a CONTINUATION-IN-PART to patent application Ser. No. 07/636,680 entitled "Vortex Generator with Torsional Vortex Sensor" filed on Dec. 31, 1990, now U.S. Pat. No. 5,127,273 and, consequently, the priority on the invention described and claimed in the present patent application is based on the aforementioned parent patent application.

BACKGROUND OF THE INVENTION

There is a strong demand and need for a vortex shedding flowmeter technology that teaches the construction of a vortex flowmeter of small port size with a short over-all length, e.g., preferably one and half to one inch in the flow passage diameter with comparable over-all length, which has good sensitivity and excellent immunity to the mechanical vibrations of the flowmeter body and the pipe line accommodating the vortex flowmeter, as such a vortex flowmeter can be packaged into an insertion type flowmeter mounted on one extremity of an elongated support member, that is inserted into and disposed in the midstream of fluid flow moving through a large diameter conduit. Of course, such a vortex shedding flowmeter technology also provides an advantage in constructing inline vortex flowmeters of wide ranging sizes, which have excellent performance characteristics and economics in price and maintenance.

BRIEF SUMMARY OF THE INVENTION

The primary object of the present invention is to provide a vortex shedding flowmeter including a vortex shedding bluff body extending across a cross section of a flow passage, wherein the bluff body includes an extension extending from one extremity thereof and into a cavity included in the flowmeter body; wherein the combination of the bluff body and the extension thereof is supported by the flowmeter body at a midsection thereof in an arrangement allowing at least a minute amount of pivotal movement thereof about a pivot axis disposed at the midsection of the combination of the bluff body and the extension thereof and substantially parallel to the direction of the fluid flow; and at least one transducer detecting stress or strain connected to at least one of the two extremities of the combination of the bluff body and the extension thereof, which transducer provides an electrical signal representing the vortex shedding from the bluff body.

Another object is to provide the vortex shedding flowmeter described in the primary object of the present invention, wherein the mass distribution of the bluff body and that of the extension of the bluff body are balanced to one another in such a way that lateral vibration of the flowmeter body in directions perpendicular to the fluid flow results in little pivoting movement of the combination of the bluff body and the extension thereof about the pivot axis located at the midsection of the combination.

A further object is to provide the vortex shedding flowmeter described in the primary object of the present invention; wherein a pair of transducers are respectively connected to the two extremities of the combination of the bluff body and the extension thereof and the two electrical signals respectively generated by the two transducers are combined in such a way that the noise created by the mechanical vibrations are cancelled therebetween and a refined signal representing the vortex shedding from the bluff body is obtained.

Yet another object is to provide the vortex shedding flowmeter described in the primary object of the present invention wherein the extension of the bluff body has a planar construction that divides the cavity accommodating the extension into two planar halves in an arrangement at least limiting the communication of pressures between the two planar halves of the cavity, wherein the combination of the bluff body and the planar extension thereof includes at least one pressure communicating hole with one end open to one side face of the bluff body and the other end open to the other side face of the planar extension of the bluff body opposite to the one side face of the bluff body.

Yet a further object is to provide the vortex shedding flowmeter described in the aforementioned object of the present invention, wherein the combination of the bluff body and the planar extension thereof includes another pressure communicating hole with one end open to the other side face of the bluff body and the other end open to one side face of the planar extension.

These and other objects of the present invention will become clear as the description thereof progresses.

BRIEF DESCRIPTION OF FIGURES

The present invention may be described with a greater clarity and specificity by referring to the following figures:

FIG. 3 illustrates a further cross section of the embodiment shown in FIG. 1.

FIG. 4 illustrates yet another cross section of the embodiment shown in FIG. 1.

FIG. 5 illustrates yet a further cross section of the embodiment shown in FIG. 1.

FIG. 6 illustrates a cross section of another embodiment of the combination of the bluff body and the extension thereof, which cross section is equivalent to that shown in FIG. 3.

FIG. 7 illustrates another cross section of the combination of the bluff body and the extension thereof shown in FIG. 6, which cross section is equivalent to that shown in FIG. 4.

DESCRIPTION OF THE ILLUSTRATED EMBODIMENTS

Figures 1, 2:
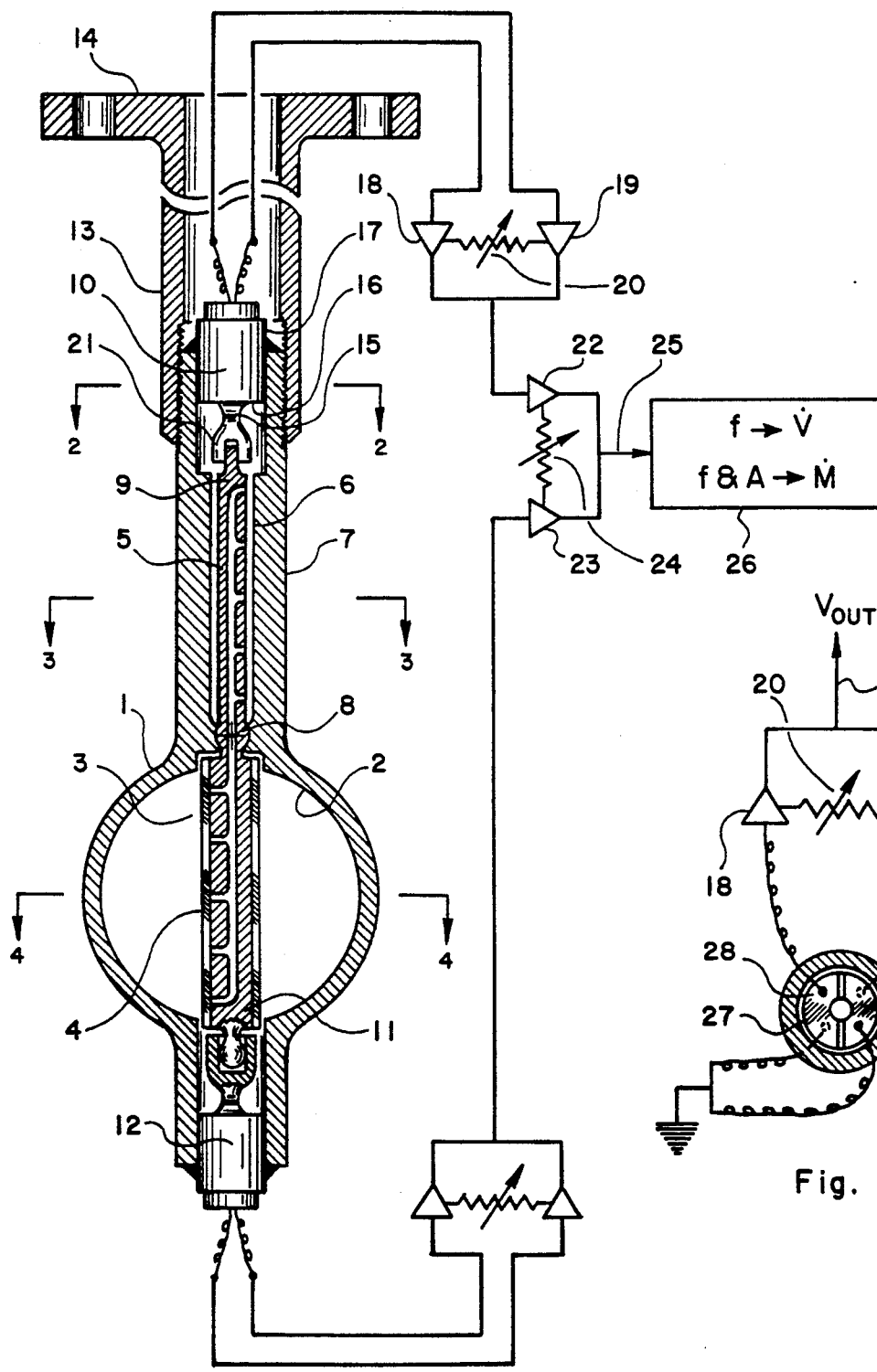
FIG. 1 illustrates a cross section of an embodiment of the vortex flowmeter constructed in accordance with the principles of the present invention.
FIG. 2 illustrates another cross section of the embodiment shown in FIG. 1, which shows a sample of the transducer usable in conjunction with the present invention.

In FIG. 1, there is illustrated a cross section of an embodiment of the vortex shedding flowmeter constructed in accordance with the principles of the present invention, which cross section is taken along a plane perpendicular to the direction of the fluid flow. The flowmeter body 1 includes a flow passage 2 with the central axis perpendicular to the place of illustration. The first half of the vortex generator-sensor combination 3 comprises a bluff body 4 of an elongated cylindrical shape disposed across a cross section of the flow passage 2, while the second half thereof comprises a planar extension 5 extending from one extremity of the bluff body 4 and into a planar cavity 6 included in an extension 7 of the flowmeter body 1, wherein the combination of the planar extension 5 and the planar cavity 6 is disposed parallel to a plane including the central axis of the flow passage 2. The midsection of the vortex generator-sensor combination 4 is supported by the flowmeter body in an arrangement allowing at least a minute amount of pivoting movement of the vortex generator-sensor combination 3 about a pivot axis 8 substantially parallel to the central axis of the flow passage 1. The support of the midsection of the vortex generator-sensor combination 3 by the flowmeter body 1 is arranged in such a way that the communication of pressure between the flow passage 2 and planar cavity 6 is limited to a minimum value. The planar extension 5 of the vortex generator-sensor combination 3 divides the planar cavity 6 into two planar halves in such an arrangement that limits the communication of pressure between the two planar halves of the planar cavity 6. One extremity 9 of the vortex generator-sensor 3 is connected to a first transducer 10, while the other extremity 11 thereof is connected to a second transducer 12. Although the vortex flowmeter of the present invention works best with both transducers shown, one of the two transducers 10 and 12 may be omitted if the mechanical vibrations creating noise are checked to a moderate level. When the vortex flowmeter of the present invention is packaged into an insertion type flowmeter, the extension 7 of the flowmeter body 1 is connected to an elongated support 13 with an anchoring flange 14 disposed at the extremity thereof. When the vortex flowmeter of the present invention is packaged into an inline type flowmeter, the elongated support 13 is not needed and, consequently, is omitted. Each of the two transducers 10 and 13 includes a piezo electric disc element with two electrodes respectively disposed on two opposite sides of a plane including a rib 15 disposed parallel to the central axis of the flow passage, which rib 15 reinforces a relatively thin end wall 16 of the transducer container vessel 17 that houses the piezo electric disc element pressed onto the thin end wall 16. The two electrical signals respectively supplied by the two electrodes included in each of the two transducers 10 and 12 are connected to a pair of amplifiers 18 and 19 with a signal level balancing means 20 therebetween, respectively. The signal level balancing means is used to combine the outputs from the two amplifiers in such a way that the noise created by the mechanical vibrations are cancelled and a refined signal representing the lateral movement of the force receiving member 21 extending from the thin end wall 16 of the container vessel 17 is obtained. The two resultant signals from the two transducers 10 and 12 are respectively fed to another pair of amplifiers 22 and 23 with a signal level balancing means 24 therebetween, which combination adds up the symmetric components of the electrical signals generated by the vortex shedding and cancels out the antisymmetric components of the electrical signals generated by the mechanical vibrations. Of course, the wiring between the amplifiers and the transducers as well as the wiring between the amplifiers and the electrodes of the piezo electric element can be switched in such a way that one inverting and one noninverting amplifier are employed in place of each pair of noninverting amplifiers shown in the particular illustrative embodiment, or a pair of inverting amplifiers may be employed in place of each pair of noninverting amplifiers shown without altering any wiring. It is well known fact that the frequency of the vortex shedding is proportional to the velocity U of the fluid flow and that the amplitude of alternating lift force experienced by the bluff body is a function of the dynamic pressure of the fluid flow that is equal to one half of the fluid density times the square of the fluid velocity. As a consequence, a data processing device 26 determines the volume flow rate V of the fluid from the frequency f of alternating output electrical signal 25 and the mass flow rate M as a function of the frequency f and the amplitude A of the output alternating electrical signal 25. The density $\rho$ of the fluid is determined as a ratio of the mass flow rate to the volume flow rate. Of course, the resultant electrical signal 25 may be obtained by using the signal level balancing means 24 without the pair of amplifiers 22 and 23.

In FIG. 2 there is illustrated another cross section of the embodiment shown in FIG. 1, which cross section is taken along plane 2—2 as shown in FIG. 1. Each side of the circular piezo electric disc element 27 pressed against the thin end wall 16 of the transducer container vessel 17 has a pair of semicircular electrodes respectively disposed on the two opposite sides of a reference plane including the reinforcing rib 15, which reference plane is parallel to the central axis of the flow passage 1. One electrode 28 in contact with one side of the piezo electric element and disposed on one side of the reference plane is connected to a first noninverting amplifier 18, while another electrode 29 in contact with the other side of the piezo electric element and disposed on the other side of the reference plane is connected to a second noninverting amplifier 19. Other electrodes not connected to the amplifiers are grounded. The alternating fluid dynamic lift forces experienced by the bluff body 4 as a result of vortex shedding therefrom alternatively compresses and decompresses the two opposite semicircular halves of the piezo electric disc element 27, and generates alternating electromotive forces of the same sign from both electrodes 28 and 29, which electromotive forces are amplified and added in such a way that the noise created by the mechanical vibrations in the directions perpendicular to the plane including the piezo electric element 27 are cancelled by means of the signal level balancing means 20 and a refined electrical signal 30 representing vortex shedding from the bluff body is obtained. In this arrangement of noise elimination, the noise created by the mechanical vibrations in directions perpendicular to the reference plane are not cancelled. Of course, such components of the noise are eliminated by combining the two alternating electrical signals respectively generated by the two transducers 10 and 12 by means of the combination of amplifiers 22 and 23, and the signal level balancing means 24. It should be understood that the piezo electric type transducer shown in FIG. 2 is merely a sample of many different types of transducers usable in conjunction with the present invention, which may be a capacitive, or resistive or optoelectric type transducer instead of the piezo electric type shown as an illustrative embodiment. It should be also understood that the two electrodes in contact with the same side of the piezo electric disc element and respectively disposed on the two opposite sides of the reference plane may be connected to an inverting and a noninverting amplifier with a signal balancing means therebetween as an alternate design to that shown in FIG. 2.

In FIG. 3 there is illustrated a further cross section of the embodiment shown in FIG. 1, which cross section is taken along plane 3—3 as shown in FIG. 1. The extension 7 of the flowmeter body 1 includes the planar cavity 6 accommodating the planar extension 5 of the bluff body 4, and a hole 31, through which the lead wires from the second transducer 12 are routed. The pressure communicating hole 32 extending from the bluff body 4 to the planar extension 5 has a first end open to one side face of the bluff body 4 and a second end open to the other side face of the planar extension 5 opposite to said one side face, while the pressure communicating hole 33 has first end open to the other side face of the bluff body 4 opposite to said one side face and a second end open to one side face of the planar extension 5 opposite to said the other side face. It is generally preferred that the extension 7 of the flowmeter body 1 has a substantially streamlined cross section to prevent undesired vortex shedding therefrom that creates additional noise, even though a nonstreamlined cross section thereof such as a circular cross section shedding vortices does not create any serious problem as the frequency of vortex shedding therefrom is much less than the frequency of the vortex shedding from the bluff body 4 due to the large difference in the width of the bluff body, and can be filtered out of operating range of the vortex shedding frequency.

In FIG. 4 there is illustrated yet another cross section of the embodiment shown in FIG. 1, that is taken along plane 4—4 as shown in FIG. 1, wherein the wall of the flow passage is not shown for brevity of illustration. The bluff body 4 includes the first pressure communicating hole 32 with one end open to one side face thereof and the second pressure communicating hole 33 with one end open to the other side face of the bluff body 4. A hollow elongated member 34 disposed across the flow passage downstream of the bluff body 4 and parallel thereto provides the lead wire conduit connected to the hole 34 shown in FIG. 3 in a leak-proof manner, through which the lead wires from the transducer 12 are routed. It should be understood that the best result is obtained when the mass distributions in the bluff body 4 and the planar extension 5 is balanced in such a way that the inertia force from the mechanical vibrations in directions perpendicular to the plane including the planar extension 5 do not produce a pivoting displacement of the combination of the bluff body 4 and the planar extension 5 about the pivot axis 8 located at a midsection of the combination. In such a balanced combination of the bluff body 4 and the planar extension 5, one or both of the pressure communicating holes 32 and 33 may be omitted at the cost of a reduced sensitivity of the flowmeter.

In FIG. 5 there is illustrated yet a further cross section of the embodiment shown in FIG. 1, which cross section is taken along a plane including the central axis of the flow passage 2. The hollow elongated member 34 disposed across the flow passage 1 downstream of the bluff body 4 and connected to the wall of the flow passage 1 in a sealed-off arrangement provides the lead wire conduit that routs the lead wires from the transducer 12 therethrough and into the combination of the flowmeter body extension 7 and the elongated support member 13. In an alternative design, the hollow elongated member 34 may be omitted and the lead wires from the transducer 12 may be routed following the outside or inside surface of the wall of the flow passage 2.

In FIG. 6 there is illustrated a cross section of the combination of the bluff body 35 and a planar extension 36 thereof having a design modification from the combination shown in FIGS. 3 and 5, which cross section is equivalent to that shown in FIG. 3.

In FIG. 7, there is illustrated a cross section of the bluff body 35 included in the modified design shown in FIG. 6, which cross section is equivalent to that shown in FIG. 4. The bluff body 35 has a planar trailing edge extension 36 that extends in a clearance relationship into a planar groove 37 included in a planar pressure shield 38 disposed across the flow passage downstream of the bluff body 35 wherein the two extremities of the planar pressure shield 38 are secured to the wall of the flow passage. The hole 39 routing the lead wires from the transducer 12 is now included in the trailing edge portion of the planar pressure shield. The combination of the planar trailing edge 36 and the planar pressure shield 38 boosts the amplitude of alternating fluid dynamic force experienced by the bluff body. When the mechanical vibrations creating the noise are checked to a moderate level, only one of the two transducers shown in FIGS. 1 and 5 may be retained, and only one of three combinations of the pair of amplifiers and signal level balancing means shown in FIG. 1 may be employed.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to those illustrative embodiments shown and described and accordingly, all suitable modifications and equivalents may be regarded as falling within the scope of the invention as defined by the claims which follow.

The embodiments of the invention, in which an exclusive property or priviledge is claimed, are defined as follows:

1. An apparatus for measuring flow rate of fluid comprising in combination:
   a) a body including a flow passage;
   b) a vortex generator-sensor of an elongated geometry including a first half extending into and across the flow passage, and a second half extending into an elongated cavity isolated from the flow passage by a barrier supporting a midsection of the vortex generator-sensor and inhibiting direct communication of fluid pressure thereacross, said midsection of the vortex generator-sensor dividing the vortex generator-sensor into said first and second halves, wherein the vortex generator-sensor includes a first pressure communicating hole with one extremity open to a first side surface of the first half of the vortex generator sensor located on one side of a plane including longitudinal central axis of the vortex generator-sensor and parallel to the central axis of the flow passage and the other extremity open to a second side surface of the second half of the vortex generator-sensor located on the other side of said plane opposite to said one side, and a second pressure communicating hole with one extremity open to a second side surface of the first half of the vortex generator opposite to said first side surface thereof and the other extremity open to a first side surface of the second half of the vortex generator-sensor opposite to said second side surface thereof; whereby fluctuating fluid pressures existing at said first and second side surfaces of the first half of the vortex generator-sensor as a result of vortex shedding from the first half of the vortex generator-sensor produces a minute pivoting movement of the vortex generator-sensor about a pivot axis parallel to said plane and located at the midsection of the vortex generator-sensor; and c) at least one transducer means connected to one of the two extremities of the vortex generator-sensor for converting the minute pivoting movement of the vortex generator-sensor to a fluctuating electrical signal representing the vortex shedding from the first half of the vortex generator-sensor.

2. An apparatus as defined in claim 1 wherein said combination includes means for determining velocity of fluid moving through the flow passage as a function of frequency of the fluctuating electrical signal.

3. An apparatus as defined in claim 1 wherein said combination includes means for determining mass flow rate of fluid moving through the flow passage as a function of frequency and amplitude of the fluctuating electrical signal.

4. An apparatus as defined in claim 1 wherein mass distributions in the first and second halves of the vortex generator-sensor are balanced about said pivot axis.

5. An apparatus as defined in claim 1 wherein said combination includes another transducer means connected to the other of the two extremities of the vortex generator-sensor opposite to said one of the two extremities thereof for converting the minute pivoting movement of the vortex generator-sensor to another fluctuating electrical signal.

6. An apparatus as defined in claim 5 wherein said combination includes an electrical circuit means for combining said another fluctuating electrical signals, wherein noise created by mechanical vibration of the body is cancelled therebetween and a resultant fluctuating electrical signal representing the vortex shedding is obtained.

7. An apparatus as defined in claim 6 wherein said combination includes means for determining velocity of fluid moving through the flow passage as a function of frequency of the resultant fluctuating electrical signal.

8. An apparatus as defined in claim 6 wherein said combination includes means for determining mass flow rate of fluid moving through the flow passage as a function of frequency and amplitude of the resultant fluctuating electrical signal.

9. An apparatus as defined in claim 6 wherein mass distribution in the first and second halves of the vortex generator-sensor are balanced about said pivot axis.

* * * * *